United States Patent [19]
Hoff

[11] 3,715,364
[45] Feb. 6, 1973

[54] NITROIMIDAZOLE CARBOXAMIDES

[75] Inventor: Dale R. Hoff, Basking Ridge, N.J.

[73] Assignee: Merck & Co., Inc., Rahway, N.J.

[22] Filed: Dec. 28, 1970

[21] Appl. No.: 102,193

Related U.S. Application Data

[63] Continuation-in-part of Ser. No. 567,365, July 25, 1966, abandoned, which is a continuation-in-part of Ser. No. 300,629, Aug. 7, 1963, abandoned.

[52] U.S. Cl. ............ 260/309, 260/211 R, 260/240 A, 260/244 R, 260/247.5 R, 260/256.4 N, 260/268 C, 260/293.7, 260/295 AM, 260/306.8, 424/248, 424/250, 424/251, 424/263, 424/267, 424/270, 424/273
[51] Int. Cl. ............................................. C07d 49/36
[58] Field of Search .260/309, 293.7, 247.5 R, 268 C

[56] References Cited

UNITED STATES PATENTS 2,944,061   7/1960   Jacob et al. ......................... 260/309

OTHER PUBLICATIONS

Allsebrook et al., J. Chem. Soc. (London) 1942, pages 232–236, QD1.C6
Baddiley et al., J. Chem. Soc. (London) 1959, pages 2893–2901, QD1.C6
Sarasin et al., Helv. Chim. Acta, Vol. 7, pages 713–719 (1942), QD1.H4
Mann et al., J. Chem. Soc. (London) 1945, pages 751–760, QD1.C6
Jones J., Amer. Chem. Soc. Vol. 71, pages 383–386 (1949), QD1.A5
Merck Index 7th ed. page 115 Rahway, N.J., Merck, 1960, RS356.M524.

*Primary Examiner*—Natalie Trousof
*Attorney*—I. Louis Wolk, J. Jerome Behan and Hesna J. Pfeiffer

[57] ABSTRACT

1-Substituted-5-nitroimidazole-2-carboxamides are prepared from a 1-substituted-5-nitroimidazole-2-carboxylic acid or acid chloride or from a 1-substituted-5-nitroimidazole-2-carboxylic acid γ-lactone by reaction with an amine. The 1-substituted-5-nitroimidazole-2-carboxamides are useful in the treatment of histomoniasis and trichomoniasis.

7 Claims, No Drawings

3,715,364

NITROIMIDAZOLE CARBOXAMIDES

This is a continuation-in-part application of U.S. Ser. No. 567,365, filed July 25, 1966, now abandoned which in turn is a continuation-in-part application of U.S. Ser. No. 300,629 filed Aug. 7, 1963, now abandoned.

This invention relates generally to new imidazoles. More particularly, it relates to imidazole-2-carboxamides, and to methods of making such compounds. Still more specifically, it is concerned with 1-substituted-5-nitroimidazole-2-carboxamides, with the chemical synthesis of such new heterocyclic compounds, and with the use of such substances against parasitic infections. It is further concerned with novel imidazoles useful as intermediates in the chemical synthesis of such amides.

Various nitroimidazole compounds have been reported previously as being useful against the poultry disease histomoniasis, and/or against the protozoal infection trichomoniasis. Examples of such substances are 1-(2-hydroxyethyl)-5-nitroimidazole, 1,2-dimethyl-5-nitroimidazole, 1-methyl-5-nitroimidazole and 1-(2-hydroxyethyl)-2-methyl-5-nitroimidazole.

Histomoniasis is a poultry disease due to the protozoan parasite Histomonas meleagridis. This disease, which affects turkeys, is also known as turkey blackhead or enterohepatitis. It is a serious economic problem to the turkey-raising industry since it spreads rapidly in turkey flocks and the mortality rate may be as high as 80 percent. The compounds now available for treating turkey blackhead are of benefit, but none of them has proven to be entirely satisfactory because they permit development of resistant strains of the infecting organism, or lead to undesired side effects when fed to the birds at the levels required to treat the disease. Thus, the search for new and improved antihistomonal compounds has continued unabated.

Trichomoniasis is another protozoan disease caused by Trichomonas vaginalis. T. Vaginalis primarily infests the human vagina and is the etiological agent of a very troublesome and prevalent form of vaginal infestation known as T. vaginalis vaginitis. Another causative organism of Trichomoniasis is T. foetus, which effects cattle, causing sterility and abortion. The drugs heretofore available for treating this condition have certain limitations and disadvantages so that in this field as well there has been continued research for the purpose of discovering improved antitrichomonal substances.

One object of the present invention is to provide a new class of chemical compounds which have a high degree of antihistomonal and antitrichomonal activity. Another object is to provide new 1-substituted-5-nitroimidazole-2-carboxamides and N-substituted carboxamides having such antiprotozoal activity. Still another object is provision of chemical syntheses of these novel carboxamide compounds from 2-hydroxymethyl imidazole. A further object is provision of new imidazole compounds that are key intermediates in such syntheses. Yet another object is provision of antitrichomonal and antihistomonal compositions containing the aforementioned 1-substituted-5-nitroimidazole-2-carboxamides as active ingredients. Further objects will become clear from the following description of the invention.

The new 1-substituted-5-nitroimidazole-2-carboxamide compounds of this invention may be represented by the structural formula

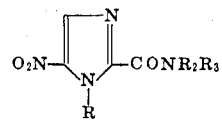

In the above formula, the substituent at the 1-position of the imidazole ring (R) may be a loweralkyl radical such as methyl, ethyl, propyl or butyl. Alternatively, it may be a hydroxyalkyl or acyloxyalkyl group as represented by the partial formula $-(CH_2)_nOX$, where $n$ is an integer having a value of 2–4, and X is hydrogen or an acyl radical, preferably benzoyl or a lower alkanoyl group of the type represented by acetyl, propionyl, butyryl, and the like. Included within this type of substituent would be groups such as 2-hydroxyethyl, 3-hydroxypropyl, 2-acetoxyethyl, 2-benzoyloxyethyl and the like.

$R_2$ in the above formula represents hydrogen or loweralkyl such as methyl, ethyl, and butyl. $R_3$ may also be hydrogen or loweralkyl, such as methyl, ethyl or butyl. In addition, $R_3$ may be hydroxyalkyl including polyhydroxyalkyl, suitably hydroxyethyl, hydroxypropyl, hydroxybutyl and the thiol analogs thereof, as well as dihydroxypropyl and tris(hydroxymethyl)methyl; aryl such as phenyl, tolyl, halophenyl such as fluorophenyl or chlorophenyl, nitrophenyl and loweralkoxyphenyl such as methoxyphenyl, aralkyl, suitably phenyl loweralkyl, such as benzyl, phenethyl or halobenzyl, such as chloro or fluorobenzyl and the like; heteroaryl, suitably aromatic heterocyclic radicals preferably containing five or six atoms in the heterocyclic nucleus of the type exemplified by thiazolyl, pyridyl, pyrimidyl and thienyl; amino, phenylamino, carboxamidoalkyl of the structure $-(CH_2)_nCONH_2$, where $n$ is an integer of value 1–4, or a glucosamine residue. Furthermore, within the scope of the invention are the substituted imidazole-2-carboxamides where $-NR_2R_3$ together represent a nitrogen containing cyclic radical such as morpholino, piperidinyl, piperazinyl or pyrrolidinyl.

Preferably, the compounds covered by this invention are those in which R is loweralkyl or hydroxyloweralkyl, $R_2$ is hydrogen or loweralkyl, and $R_3$ is hydrogen, loweralkyl, hydroxyloweralkyl, mercaptoloweralkyl, phenyl, tolyl, halophenyl, nitrophenyl, loweralkoxyphenyl, or amino, or $NR_2R_3$ together are morpholino, piperidinyl, piperazinyl, or pyrrolidinyl.

Even more preferably, R and $R_2$ are as defined above, and $R_3$ is hydrogen, loweralkyl, or hydroxyloweralkyl. $R_3$ can also be amino, phenyl, or substituted phenyl such as halophenyl, nitrophenyl, and loweralkoxyphenyl, or tolyl. In addition, $R_3$ can be mercaptoloweralkyl. The group $NR_2R_3$ together can also preferably be morpholino.

In the above definition of the invention, the terms "loweralkyl", "loweralkoxy", "alkyl", "alkoxy" are employed to indicate a carbon chain of one–five carbon atoms. The term "halo" is used to indicate all four members of the series, i.e., chloro, bromo, fluoro, and iodo.

Thus, it will be clear from the above discussion that this invention contemplates 1-loweralkyl (or hydroxyalkyl or acyloxyalkyl)-5-nitroimidazole-2-carboxamide itself as well as those compounds where the amide moiety is further substituted. When reference is made broadly in this description to imidazole-2-carboxamides, it is intended to include both the primary amide and the substituted amides.

In accordance with this invention, the novel 1-loweralkyl-5-nitroimidazole-2-carboxamides described herein are synthesized by the process depicted in the following flow diagram.

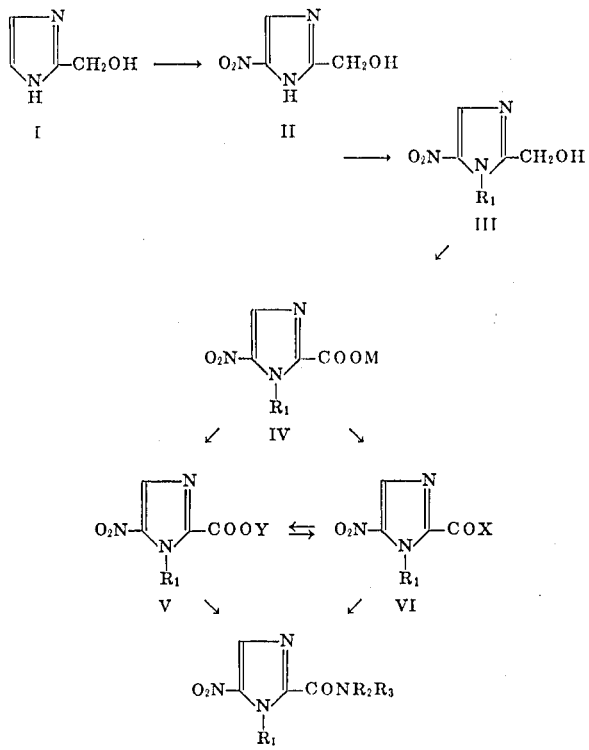

In the above formula, $R_1$ represents loweralkyl; M represents a metal, and preferably an alkali metal such as sodium or potassium or an alkaline earth metal such as calcium or barium; Y is a hydrocarbon radical of less than nine carbon atoms and preferably a loweralkyl group; and X represents chlorine or bromine. $R_2$ and $R_3$ have the same meaning as previously set forth.

The details of making the 1-alkyl-5-nitroimidazole-2-carboxamide compounds of this invention will now be described in detail. For the sake of convenience, the following discussion will be directed primarily to the preparation of compounds wherein the 1 position of the imidazole ring is substituted with a methyl group. It being understood, however, that similar reaction conditions will be employed for making the other 1-loweralkyl-5-nitroimidazole-2-carboxamide compounds in the invention, and that the description is intended to apply as well to the synthesis of such substances.

According to the first step of this process, 2-hydroxymethyl imidazole is nitrated to form 2-hydroxymethyl-5-nitroimidazole, compound II in the above flow sheet. This nitration step is brought about by contacting the hydroxymethyl compound with a suitable nitrating agent. As the nitrating agent, it is preferred to use nitric acid in the presence of boron trifluoride. However, acetyl nitrate or sulfur trioxide-nitric acid are also satisfactory. For best results, it is desirable that the hydroxymethyl substituent by protected by esterification or etherification prior to the nitration itself. It is convenient to make a lower alkanoic acid ester such as the acetate ester by contacting the hydroxymethyl compound with acetic anhydride. Other esters could, of course, be utilized by treating the starting material with appropriate esterifying agents such as propionic anhydride, butyric anhydride and the like. The nitration is carried out by treating the ester of 2-hydroxymethyl imidazole with the nitrating agent in an anhydrous reaction medium. The reactants may be mixed in the cold and then allowed to warm slowly to room temperature. The nitration reaction mixture is then heated at temperatures in the range of 60°-100°C. for short periods of time. When acetyl nitrate is used as the nitrating agent, the reaction is normally substantially completed in less than one hour, whereas reaction periods of about 2-8 hours are preferred with nitric acid-boron trifluoride. The reaction times and temperatures are not unduly critical and may be modified within reason. It will be appreciated by those skilled in the art that the reaction will proceed to completion faster at higher temperatures. At the end of the nitration, the reaction mixture is neutralized with a base and the nitrated imidazole extracted into an organic solvent such as chloroform, methylethyl ketone, butanol or ethyl acetate. The esterified hydroxymethyl group, if present, is hydrolyzed, and the 2-hydroxyethyl-5-nitroimidazole recovered and purified.

According to the next step of the process, 2-hydroxymethyl-5-nitroimidazole is alkylated at the 1-position by reaction with a lower alkylating agent. Suitable alkylating agents are the diloweralkyl sulfates such as dimethyl sulfate, diethyl sulfate and the like or sulfonates of the type exemplified by methyl benzene sulfonate, ethyl p-toluene sulfonate, and propyl benzene sulfonate.

It is a critical feature of this step of the invention that anionization of the imidazole be minimized, and preferably substantially completely suppressed. Otherwise, other undesired alkylated imidazoles are produced. To accomplish this, I prefer to carry out the alkylation in the absence of a solvent. If a solvent is considered necessary or desirable for any reason, inert solvents such as diphenyloxide, tetramethylenesulfone, hexachlorobenzene naphthalene or diphenylether may be used. Satisfactory results are obtained by using about equimolar quantities of the imidazole compound and the alkylating agent. However, up to about a 50 percent excess of alkylating agent can be employed if desired without adversely affecting the reaction. The alkylation reaction goes substantially to completion in from 5 minutes to one hour at temperatures in the range of about 75°-225°C., and preferably 100°-175°C. At the end of this time, any remaining alkylating agent is neutralized with a base, such as sodium hydroxide, and the 1-loweralkyl-2-hydroxymethyl-5-nitroimidazole compound recovered by extraction with an organic solvent. In this way, and utilizing the appropriate alkylating agents, there are produced 1-methyl-2-hydroxymethyl-5-nitroimidazole and the corresponding 1-ethyl, 1-propyl, and 1-butyl imidazoles.

In the next phase of the process, the 1-loweralkyl-2-hydroxymethyl-5-nitroimidazoles of Formula III hereinabove are converted by an appropriate oxidation reaction to the corresponding 2-carboxylic acid compound (Formula IV). This oxidation is preferably carried out by contacting the 2-hydroxymethyl imidazole compound with the oxidizing agent in an alkaline medium. Alkali metal permanganates such as sodium or potassium permanganate are the preferred oxidants. The permanganate oxidation is conducted at room temperature or below, in a solvent medium which is itself resistant to oxidation. Examples of suitable solvents that might be mentioned are acetone, methylethyl ketone, cyclopentanone, and dimethylsulfone. In addition to an alkali metal permanganate, the oxidation reaction may also be carried out with oxidizing agents such as sodium hypochlorite or nickel peroxide. An alkali metal dichromate, e.g., potassium dichromate could also serve but is not preferred because of the formation of metal complexes which are difficult to separate from the desired product. 1-Loweralkyl-5-nitroimidazole-2-carboxylic acid itself is an unstable compound which tends to decarboxylate almost spontaneously. For this reason, the product is isolated in the form of a salt such as an alkali metal salt, e.g., the sodium or potassium salts. These salts may be purified if desired although it has been found quite satisfactory in my process to employ them without extensive purification in the ensuing steps of the synthesis. In this fashion, there are obtained the sodium or potassium salts of 1-methyl-5-nitroimidazole-2-carboxylic acid, 1-ethyl-5-nitroimidazole-2-carboxylic acid and 1-propyl-5-nitroimidazole-2-carboxylic acid.

In the next reaction, the 1-loweralkyl-5-nitroimidazole-2-carboxylic acid salt is converted to the corresponding acid halide or ester. The acid halide may be either the acid chloride or acid bromide. The esters employed in my process are preferably loweralkyl esters such as the methyl, ethyl, propyl or isopropyl, although aryl or aralkyl esters such as the phenyl or benzyl esters could be used. As will be noted from the foregoing flow sheet, the acid salt may be converted to either the acid halide or the ester. In addition, the esters and acid halides may be converted one to the other. This is sometimes desirable as a means of obtaining a compound that can be purified without undue difficulty. For instance, in many cases, the esters may be purified more readily than the acid halides. Either an acid halide or an ester may be converted directly to the final amides. When tertiary amides are to be synthesized (i.e., those compounds of Formula VII above, wherein both $R_2$ and $R_3$ are other than hydrogen,) it is preferable and in some cases necessary to use the acid chloride as starting material since the tertiary amines do not react readily with 1-loweralkyl-5-nitroimidazole-2-carboxylic acid esters. This will be discussed further herein below.

The acid halides of Formula VI above are obtained from the corresponding acid salts of Formula IV above or from the esters of Formula V by intimately contacting said compounds with a halogenating agent. Examples of suitable halogenating agents are oxalyl chloride, oxalyl bromide, thionyl chloride, phosphorus oxychlorides, phosphorus pentachloride and phosphorus pentabromide. The oxalyl halides are preferred. The reaction may be conducted in an inert organic solvent, and for this purpose solvents such as benzene, toluene, xylene and dimethylsulfoxide are suitable. Alternatively, an excess of a liquid halogenating agent can be employed as the reaction solvent. Formation of the 1-loweralkyl-5-nitroimidazole-2-carbonyl halide occurs rapidly, and the reaction is usually substantially complete in from 5 to 90 minutes at elevated temperatures. In order to insure that the reaction goes to completion, an excess of the oxalyl halide is normally used. The crude 1-loweralkyl-5-nitroimidazole-2-carbonyl halide obtained in this fashion is satisfactory without further purification for conversion into a loweralkyl ester or for direct preparation of an imidazole-2-carboxamide. However, if desired, the imidazole-2-carbonyl halide may be purified by recrystallization from an inert organic solvent such as benzene or toluene.

Examples of compounds obtained in this way are 1-methyl-5-nitroimidazole-2-carbonyl chloride, 1-methyl-5-nitroimidazole-2-carbonyl bromide, 1-ethyl-5-nitroimidazole-2-carbonyl chloride, 1-n-propyl-5-nitroimidazole-2-carbonyl chloride and 1-butyl-5-nitroimidazole-2-carbonyl bromide. These 1-loweralkyl-5-nitroimidazole-2-carbonyl halides, on treatment with an appropriate amine, yield the corresponding 1-loweralkyl-5-nitroimidazole carboxamides. Thus, reaction of an imidazole-2-carbonyl chloride with ammonia gives the corresponding imidazole-2-carboxamide itself. When substituted amines are used in the reaction, the correspondingly N-substituted 1-loweralkyl-5-nitroimidazole-2-carboxamides are produced.

Loweralkyl esters of 1-loweralkyl-5-nitroimidazole-2-carboxylic acid may be conveniently obtained from the corresponding 2-carbonyl halide by reaction thereof with a lower alkanol in the presence of a base such as pyridine. It is preferred that this esterification reaction be brought about in an anhydrous or substantially anhydrous reaction medium, and, although not essential, that a base be present to serve as an acid binding agent. Satisfactory results are obtained by allowing the acid halide to stand in a lower alkanol in the presence of a small amount of base for from 15 minutes to about 2 hours at room temperature. The reaction conditions are not critical and may be varied, as will be appreciated by those skilled in this art.

Alternatively, the esters of 1-loweralkyl-5-nitroimidazole-2-carboxylic acid may be produced directly from the carboxylic acid salts by reaction of those salts with an esterifying agent in a suitable solvent medium. For example, the imidazole acid salts may be treated with esterifying agents such as dimethyl or diethyl sulfate in solvents such as acetonitrile, dimethylformamide or dimethylsulfoxide at temperatures of about room temperature to about 75°C. for short periods of time. Under these conditions, the corresponding loweralkyl ester is produced in good yield and in a substantial degree of purity.

Representative examples of esters produced according to this invention are ethyl 1methyl-5-nitroimidazole-2carboxylate, methyl 1-methyl-5-nitroimidazole-2-carboxylate, propyl 1-ethyl-5-nitroimidazole-2-carboxylate, benzyl 1-methyl-5-nitroimidazole-2-carboxylate and ethyl 1-propyl 5-nitroimidazole-2-carboxylate.

As mentioned previously, the antihistomonal and antitrichomonal 1-loweralkyl-5-nitroimidazole-2-carboxamides of this invention are obtained in good yield by treating a 1-loweralkyl-5-nitroimidazole-2-carbonyl chloride or a loweralkyl ester of 1-loweralkyl-5-nitroimidazole-1-carboxylic acid with an amine. When ammonia is employed as the amine reactant, 1-loweralkyl-5-nitroimidazole-2-carboxamide itself it obtained. Substituted amines will, of course, yield the correspondingly substituted amides. Suitable amines include phenylamines, such as aniline and substituted phenylamines such as fluoroaniline, chloroaniline, toluidine, nitraniline and alkoxyanilines such as anisidine. Also suitable are loweralkyl amines, such as methylamine, ethylamine, butylamine and propylamine and hydroxyalkylamines and the thio analogs thereof, for example ethanolamine, propanolamine, butanolamine and methyl mercaptan, ethyl mercaptan, and butyl mercaptan. Included among this group are also the polyhydroxyalkanolamines, such as amino glycerol and tris (hydroxymethyl)methylamine. Amines derived from nitrogenous hetero aryl radicals may also be employed. These include amino imidazoles, amino pyridines and amino pyrimidines. A further group of amines which are suitable are the amides of amino acids such as glycine amide, valine amide, alanine amide, leucine amide and isoleucine amide. The reaction conditions necessary for preparing these imidazole carboxamides are not unduly critical and essentially comprise intimately contacting the amine with the 1-loweralkyl-5-nitroimidazole-2-carbonyl halide or carboxylate ester in a suitable solvent medium. The solvent should be one that is non-reactive under the conditions employed, and organic solvents such as benzene, toluene, lower alkanols such as methanol, ethanol or isopropanol and substances such as dimethylformamide or tetrahydrofuran have been found quite satisfactory. The reaction proceeds to completion quickly at room temperature, using an excess of the amine reactant. The resulting amide is recovered and purified by techniques that will be known to those skilled in this art.

Representative of the 1-loweralkyl-5-nitroimidazole-2-carboxamide compounds of this invention, and which may be synthesized according to the procedures described are 1-methyl-5-nitroimidazole-2-carboxamide, 1-ethyl-5-nitroimidazole-2-carboxamide, 1-n-propyl-5-nitroimidazole-2-carboxamide, 1,N'-dimethyl-5-nitroimidazole-2-carboxamide, N'-phenyl-1methyl-5-nitroimidazole-2carboxamide, N'-(2-hydroxyethyl)-1methyl-5nitroimidazole-2carboxamide, 1-methyl-5-nitroimidazole-2-carbonyl hydrazine, N-(1-ethyl-5-nitroimidazole-2-carbonyl)-morpholine, N',N'-di-(2-hydroxyethyl)-1-methyl-5-nitroimidazole-2carboxamide, N'-(2-hydroxyethyl)-1,N'-dimethyl-5-nitromidazole-2carboxamide, N'-(2-hydroxyethyl)-1-ethyl-5-nitroimidazole-2-carboxamide, and N',N'-diethyl-1-methyl-5-nitroimidazole-2-carboxamide.

The 1-(hydroxyalkyl)-5-nitroimidazole-2-carboxamides which are a part of this invention are prepared from 1-(hydroxyalkyl)-2-(β-phenylvinyl)-5-nitroimidazole. As applied to synthesis of 1-(2-hydroxyethyl)-5-nitroimidazole-2-carboxamide, the process is represented as follows:

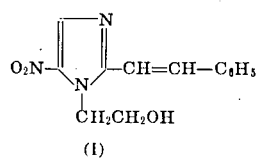

(1)

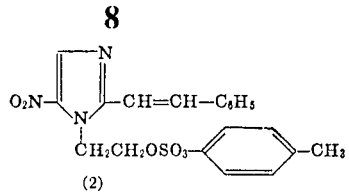

(2)

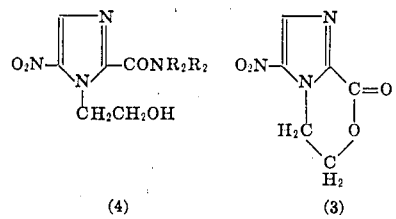

(4)    (3)

where $R_2$ and $R_3$ have the same meaning as previously set forth.

In the first step of this process, the 1-hydroxyalkyl substituent is "blocked" by formation of a sulfonate such as the methane sulfonate, the p-toluene sulfonate or the like. The sulfonyloxy compound is then oxidized with a suitable oxidizing agent, and for this purpose an alkali or alkaline earth metal permanganate is preferred. The β-phenylvinyl group at the 2-position of the imidazole ring is thereby oxidized to a carboxylic acid residue. This oxidized product is not stable. The γ-lactone of formula 3 above forms in the reaction mixture and is conveniently isolated as such. The oxidation of the 1-(sulfonyloxyalkyl)-2-(β-phenylvinyl)-5-nitroimidazole, and the reaction of the resulting lactone with an amine are carried out under essentially the same conditions as previously described for the oxidation of 1-loweralkyl-2-hydroxymethyl-5-nitroimidazole with an alkaline permanganate, and for production of 1-loweralkyl-5-nitroimidazole-2-carboxamides of formula VII. On reaction of the lactone with ammonia, or with a secondary amine, the 1-(2-hydroxyalkyl)-5-nitroimidazole-2-carboxamide compound of Formula (4) above is produced.

Included among the 1-(hydroxyalkyl)-5-nitroimidazole-2-carboxamide compounds obtained in this fashion are 1-(2-hydroxyethyl)-5-nitroimidazole-2-carboxamide, N'-methyl 1-(2-hydroxyethyl)-5-nitroimidazole-2-carboxamide, 1-(3-hydroxypropyl)-5-nitroimidazole-2-carboxamide, N',1-di-(2-hydroxyethyl)-5-nitroimidazole-2-carboxamide, and N,N'-dimethyl-1-(2-hydroxyethyl)-5-nitroimidazole-2-carboxamide. The corresponding 1-(acyloxyalkyl)-5-nitroimidazole-2-carboxamide compounds are conveniently obtained by esterification of the 1-(hydroxyalkyl) imidazole according to known techniques. Thus, for instance, reaction of the 1-hydroxyalkyl compound with a lower alkanoyl chloride or benzoyl chloride in the presence of a base such as pyridine, affords the corresponding 1-(loweralkanoyloxyalkyl) or 1-(benzoyloxyalkyl) derivatives.

The 1-substituted-5-nitroimidazole-2-carboxamide compounds of this invention are effective in controlling enterohepatitis in turkeys. For this purpose, they are administered to turkeys mixed with an element of turkey sustenance, e.g., feed or drinking water. Good control of the disease is obtained when the imidazole compounds of the invention are incorporated in a turkey feed ration at levels of from about 0.003 to about 0.05 percent by weight and preferably from about 0.0125–0.04 percent by weight, of the feed. The optimum concentration will depend to a large extend on the age of the birds, the severity of the infection and the particular substance employed. With these feed levels, good control of the disease is realized with essentially no undesirable side effects or retardation of growth of the turkeys. When the turkey feed or turkey ration is employed as the carrier vehicle for my 1-substituted 5-nitroimidazole-2-carboxamide compounds, it is desirable that the drug be uniformly mixed throughout the feed. This is accomplished by first preparing a premix or feed supplement composition wherein the active ingredient is present in concentrations from about 1 to about 40 percent by weight and where the carrier or diluent is a non-toxic orally ingestable vehicle. It is preferred that the carrier be a nutritive one, examples of which are corn distillers dried grains, wheat shorts, wheat middling, soybean meal, fermentation residues and corn meal. These supplements or premixes are then uniformly mixed through the turkey ration by conventional techniques such as grinding or milling.

A second route of administration is by way of the drinking water of the turkeys. This is preferred when the turkeys are severely infected since the birds will normally continue to drink after they have stopped eating solid food. Somewhat higher dose levels are employed for the drinking water route than for the solid feed method of administration, and levels of the nitroimidazole-2-carboxamide compounds in the drinking water of from about 0.025 to about 0.1 percent by weight are quite satisfactory. Some of the amides of the invention are not highly water soluble, and when any such are used, it is desirable to use suspending or emulsifying agents, or to make a water soluble form of the drug.

The turkey feed levels at which representative members of the compounds of the invention are active in controlling turkey blackhead disease are as follows:

| Compound | % by Weight in Feed |
| --- | --- |
| 1- Methyl-5-nitroimidazole-2-carboxamide | 0.006–0.008 |
| 1, N'-Dimethyl-5-nitroimidazole-2-carboxamide | 0.0125 |
| 1-Methyl-5-nitroimidazole-2-carbonylhydrazine | 0.025 |
| N'-Phenyl-1-methyl-5-nitroimidazole-2-carboxamide | 0.0125 |
| 1,N',N'-Trimethyl-5-nitroimidazole-2-carboxamide | 0.006 |
| N-(1-Methyl-5-nitroimidazole-2-carbonyl) morpholine | 0.025 |

In addition to the amides, it has also been found that certain of the intermediates useful in making such amides have antihistomonal activity in their own right. Thus, the ethyl ester of 1-methyl-5-nitroimidazole-2-carboxylic acid is active against blackhead at a level of 0.0125 percent by weight in the feed, and 1-methyl-2-hydroxymethyl-5-nitroimidazole is active at 0.025 percent by weight in the turkey feed.

As previously stated, the 1-substituted-5-nitroimidazole-2-carboxamide compounds described herein also have a significant degree of antitrichomonal activity. When employed in treating the protozoan disease trichomoniasis, they are administered orally in unit dosage form, usually in tablets or capsules. Tablets or capsules containing from about 100 to about 500 milligrams of active antitrichomonal ingredient are quite satisfactory and are prepared by techniques known to those skilled in the pharmaceutical art. Thus, these dosage forms will contain the normal diluents, excipients, lubricating agents and extenders regularly employed in compounding solid oral dosage forms. Alternatively, the drugs may be suspended or dissolved in liquid vehicles designed for oral administration. The compounds preferred for use against *T. vaginalis* vaginitis and the in vivo activity in mice of such compounds is set forth below. Activity is expressed in terms of mg./kg., as determined by the method described in Cuckler, Kupferberg & Millman, "Chemotherapeutic and Tolerance Studies on Amino-nitro Thiazoles" Antibiotics & Chemotherapy, 10: 540–550, 1955.

| Compound | Activity |
| --- | --- |
| 1-Methyl-5-nitroimidazole-2-carboxamide | 10 |
| 1,N'-Dimethyl-5-nitroimidazole-2-carboxamide | 10 |
| 1,N',N'-Trimethyl-5-nitroimidazole-2-carboxamide | 10 |
| N'-(2-Hydroxyethyl)-1-methyl-5-nitroimidazole-2-carboxamide | 20 |
| N-(1-Methyl-5-nitroimidazole-2-carbonyl)-morpholine | 40 |
| 1-(2-Hydroxyethyl)-5-nitroimidazole-2-carboxamide | 20 |
| N-(2,3-Dihydroxypropyl)-1-methyl-5-nitroimidazole-2-carboxamide | <100 |

It has additionally been discovered that certain of the 1-substituted-5-nitroimidazole compounds of this invention have a surprising degree of antibacterial activity, particularly against the gram positive Staphylococci and Streptococci, and the gram negative *Salmonella Schottmullieri*. These are set forth below, the numerical figures indicating the concentration in γ/ml. at which the compounds are effective in in vitro experiments.

| Compound | S. Schott. | Staph. | Strep. |
| --- | --- | --- | --- |
| 1,N'-Dimethyl-N'-phenyl-5-nitroimidazole-2-carboxamide | 200 | | |
| 1-Methyl-5-nitroimidazole-2-carbonyl hydrazine | | 50 | 25 |
| 1-Methyl-5-nitroimidazole-2-carboxamide | | 50 | 200 |
| N'-(2,3-Dihydroxypropyl)-1-methyl-5-nitroimidazole-2-carboxamide | 200 | | 25 |
| 1-(2-Hydroxyethyl)-5-nitroimidazole-2-carboxamide | 200 | | 50 |
| 1,N'-Di-(2-hydroxyethyl)-5-nitroimidazole-2-carboxamide | | 50 | 25 |

The following examples are given for the purpose of illustration and not by way of limitation:

EXAMPLE 1

2-Hydroxymethyl-4(5)-Nitroimidazole

A. 83.0 Gm. (0.864 M) of 2-hydroxymethyl imidazole is dissolved in 200 ml. of acetic anhydride. The solution is allowed to stand overnight at room temperature. The acetate salt of 2-acetoxymethyl imidazole crystallizes. The crystalline solid is slurried well with ether, filtered and the crystals are washed with ether until the odor of acetic acid is no longer detectable. The 2-acetoxymethyl imidazole acetic acid salt melts at 80°C. The 2-acetoxy methyl imidazole acetic acid salt is dissolved in 10 percent sodium bicarbonate and the 2-acetoxymethyl imidazole extracted with ethyl acetate. Evaporation of the ethyl acetate extracts, in vacuo, and recrystallization of the residue from ethyl acetate affords 2-acetoxymethyl imidazole, m.p. 82°–85°C.

B. 176.6 Gm (0.882 M) of 2-acetoxymethyl imidazole acetic acid salt is added in small amounts to 165 ml. of cold, fuming 90 percent nitric acid. This solution is added slowly with stirring and cooling to 150 ml. of cold, fuming 90 percent nitric acid containing 90.1 gm. of gaseous $BF_3$. The reaction mixture is heated on the steam cone for 5 hours.

After cooling to room temperature, the reaction mixture is poured over ice and neutralized with sodium hydroxide. The resulting solution is then extracted with ethyl acetate, and the ethyl acetate extracts evaporated, in vacuo, to dryness. The residue is refluxed for 1 hour in a solution of 100 ml. of 2.5N sodium hydroxide and 100 ml. of methanol. The solution is then neutralized with hydrochloric acid and extracted with ethyl acetate. The extracts are evaporated to dryness, dissolved in methanol and chromatographed over charcoal.

Elution of the charcoal with 50 percent ether-acetone first removes a small amount of imidazole-2-carboxaldehyde. The next substance eluted is 2-hydroxymethyl-4(5)-nitroimidazole. After recrystallization from acetone, this melts at 156°–158°C.

EXAMPLE 2

1-Methyl-2-Hydroxymethyl-5-Nitroimidazole 12.6 Gm. of dimethyl sulfate is added to 11.1 gm. of 2-hydroxymethyl-4(5)-nitroimidazole and concentrated mass thoroughly mixed. The mass is then heated on the steam cone for 2 hours and cooled to room temperature.

A small amount of ice is added, and the remaining dimethyl sulfate and methyl hydrogen sulfate neutralized by slow addition of concentrated ammonium hydroxide. The resulting solution is extracted with chloroform. The chloroform extracts are separated and evaporated to dryness to yield a residue consisting of 1-methyl-2-hydroxymethyl-5-nitroimidazole. Recrystallization from acetone affords substantially pure 1-methyl-2-hydroxymethyl-5-nitroimidazole, m.p. 117°–119°C.

When the above reaction is carried out using diethyl sulfate or dipropyl sulfate in place of dimethyl sulfate, there is obtained respectively 1-ethyl-2-hydroxymethyl-5-nitroimidazole and 1-propyl-2-hydroxymethyl-5-nitroimidazole.

Elution of the charcoal with 50 percent ether-acetone first removes a small amount of imidazole-2-carboxaldehyde. The next substance eluted is 2-hydroxymethyl-4(5)-nitroimidazole. After recrystallization from acetone, this melts at 156°–158°C.

EXAMPLE 3

1-Methyl-2-Hydroxymethyl-5-Nitroimidazole 0.12 Mol of methyl p-toluene sulfonate is added to 0.10 mol of 2-hydroxymethyl-4(5)-nitroimidazole and the mass thoroughly mixed. The mass is then heated on the steam cone for 2 hours and cooled to room temperature.

A small amount of ice is added, and the remaining methyl p-toluene sulfonate and toluene sulfonic acid neutralized by slow addition of concentrated ammonium hydroxide. The resulting solution is extracted with chloroform. The chloroform extracts are separated and evaporated to dryness to yield a residue consisting of 1-methyl-2-hydroxymethyl-5-nitroimidazole. Recrystallization from acetone affords substantially pure 1-methyl-2-hydroxymethyl-5-nitroimidazole.

When the above reaction is carried out using p-toluene sulfonate or propyl p-toluene sulfonate in place of dimethyl sulfate, there is obtained respectively 1-ethyl-2-hydroxymethyl-5-nitroimidazole and 1-propyl-2-hydroxymethyl-5-nitroimidazole.

EXAMPLE 4

Potassium 1-Methyl-5-Nitroimidazole-2-Carboxylate 5.0 Gm. (0.0318 M) of 1-methyl-2-hydroxymethyl-5-nitroimidazole is suspended in 75 ml. of cold acetone. While maintaining the temperature at 0° to −5°C., 6.65 gm. (0.048 M) of potassium permanganate is added in small portions with vigorous stirring. After the last addition of permanganate, the reaction is allowed to warm slowly to room temperature.

The reaction mixture is filtered and the solid material is extracted with water. The aqueous extracts are evaporated to dryness, in vacuo, to give a residue of crystalline potassium 1-methyl-5-nitroimidazole-2-carboxylate mixed with potassium hydroxide. This imidazole may be used without further purification in the further steps of the process.

When the process is carried out using 1-ethyl-2-hydroxymethyl-5-nitroimidazole or 1-propyl-2-hydroxymethyl-5-nitroimidazole as starting materials, potassium 1-ethyl-5-nitroimidazole-2-carboxylate and potassium 1-propyl-5-nitroimidazole-2-carboxylate are obtained.

EXAMPLE 5

1-Methyl-5-Nitroimidazole-2-Carbonyl Chloride 1.0 Gm. sample of crude potassium 1-methyl-5-nitroimidazole-2carboxylate is added with rapid stirring to 40 ml. of oxalyl chloride, and the reaction mixture is refluxed for 1 hour.

The reaction mixture is then evaporated to dryness in vacuo. A small amount of benzene is added to the residue, and the benzene removed from the resulting suspension by evaporation in vacuo. The resulting 1-methyl-5-nitroimidazole-2-carbonyl chloride is dried and stored under vacuum. It is not free of inorganic salts, but may be used directly in further steps of the process without further purification.

1-Ethyl-5-nitroimidazole-2-carbonyl chloride and 1-propyl-5-nitroimidazole-2-carbonyl chloride are obtained in similar fashion from the appropriate potassium 1-loweralkyl-5-nitroimidazole-2-carboxylate.

EXAMPLE 6

Ethyl 1-Methyl-5-Nitroimidazole-2-Carboxylate

470 Milligrams of crude potassium 1-methyl-5-nitroimidazole-2-carboxylate is refluxed for one half hour with 5 ml. of oxalyl chloride. Most of the excess oxalyl chloride is then removed by concentration in vacuo; the last traces are removed by adding 3–4 ml. of benzene to the residue and similarly evaporating the benzene. The solid residue of salts and acid chlorides is then dissolved in a mixture of 5 ml. of very dry ethanol and 1 ml. of dried pyridine. After standing at room temperature for one half hour, the mixture is diluted with 40–50 ml. of methylene dichloride and extracted once with excess dilute HCl to remove the pyridine. After one extraction with dilute NaHCO₃, the organic phase is dried over Na₂SO₄ and evaporated in vacuo to give an oil which partially crystallizes on sanding.

This oil is dissolved in about 5 ml. of ether, and about 5 ml. of petroleum ether is added. Most of the ether is then boiled off leaving a cloudy solution which is placed on a 3 gm. Al₂O₃ (Merck basic) column prepared in petroleum ether. The column height is about equal to its diameter to facilitate a fast flow rate. The column is eluted with about 40 ml. of petroleum ether to remove most of the ethyl benzoate, and then with about 40 ml. ether-methylene dichloride (4:1) to remove the ethyl 1-methyl-5-nitroimidazole-2-carboxylate. Evaporation of this latter ether fraction yields 136 mg. of the desired product. It is recrystallized by dissolving in 2 ml. of ether, adding 2 ml. of petroleum ether and concentrating until the solution becomes slightly cloudy. Cooling yields crystalline ethyl 1-methyl-5-nitroimidazole-2-carboxylate, m.p. 80°–81°C.

Treatment of potassium 1-ethyl-5-nitroimidazole-2-carboxylate and potassium 1-propyl-5-nitroimidazole-2-carboxylate with oxalyl chloride, and reaction of the resulting carbonyl chlorides with methanol in pyridine as described above affords methyl 1-ethyl-5-nitroimidazole-2-carboxylate and methyl 1-propyl-5-nitroimidazole-2-carboxylate, respectively.

EXAMPLE 7

1-Methyl-5-Nitroimidazole-2-Carboxamide; 1,N',N'-Trimethyl-5-Nitroimidazole-2-Carboxamide A. 0.86 Gm. of crude 1-methyl-5-nitroimidazole-2-carbonyl chloride, obtained as in Example 4, is suspended in 5 ml. of benzene. The resulting suspension is filtered to remove inorganic salts. As excess of anhydrous ammonia is bubbled into the benzene solution, with rapid stirring. The benzene is then removed in vacuo, and the residue of 1-methyl-5-nitroimidazole-2-carboxamide is dissolved in a minimum amount of ethyl acetate. The ethyl acetate solution is filtered and the filtrate concentrated to dryness. The residual 1-methyl-5-nitroimidazole-2-carboxamide is recrystallized from acetone to give substantially pure material, m.p. 222°–224°C. (subl.), λ max. 302 mμ, E percent 613 (CH₃OH).

1-Ethyl-5-nitroimidazole-2-carboxamide and 1-propyl-5-nitroimidazole-2-carboxamide are obtained when 1-ethyl-5-nitroimidazole-2-carbonyl chloride and 1-propyl-5-nitroimidazole-2-carbonyl chloride are reacted with ammonia according to the above-described procedure.

B. The substitution of gaseous dimethylamine for ammonia in the foregoing procedure results in the formation of 1,N',N'-trimethyl-5-nitroimidazole-2-carboxamide, m.p. 125°–127°C., λ max. 302.5 mμ, E percent 500 (CH₃OH), after recrystallization from ether.

EXAMPLE 8

5.0 Gm. (0.02 M) of 1-methyl-5-nitroimidazole-2-carbonyl chloride is dissolved in 100 ml. of warm benzene. This solution is then added with rapid stirring to 15 ml. of N-methylaniline in 100 ml. of ether. The solution becomes warm due to heat of reaction. It is filtered warm to remove the solid N-methylaniline hydrochloride which forms.

The benzene filtrate is evaporated to near dryness in vacuo. The residue is triturated with ether. Crystallization of 1,N'-diethyl-N'-phenyl-5-nitroimidazole-2-carboxamide begins and is allowed to proceed to completion in the cold. The crystalline product is then recovered by filtration and washed with cold ether. The solid is recrystallized from acetone-ether to give substantially pure 1,N'-dimethyl-N'-phenyl-5-nitroimidazole-2-carboxamide, m.p. 106°–108°C., λ max. 306.0 mμ, E percent 367 (CH₃OH).

This procedure is employed to prepare the amides listed in Table I below from 1-methyl-5-nitroimidazole-2-carbonyl chloride and ethereal solutions of the appropriate amine.

TABLE I

| End Product | M.P. | $\lambda^{CH_3OH}_{max.}$ | E% | Amine Reactant |
|---|---|---|---|---|
| 1. N-(1-methyl-5-nitroimidazole-2-carbonyl) | 148°–150°C | 301.0 | 432 | morpholine |
| 2. N'-phenyl-1-methyl-5-nitroimidazole-2-carboxamide | 192°–194°C | 317.0 / 246.0 | 532 / 355 | aniline |
| 3. 1-Methyl-4-(1-methyl-5-nitroimidazole-2-carbonyl)-piperazine | 114°–115°C | 301.0 | 415 | N-methyl piperazine |
| 4. 1-Phenyl-2-(1-methyl-5-nitroimidazole-2-carbonyl) hydrazine | 206°–207°C | 295.0 / 223.0 | 175 / 468 | phenyl hydrazine |
| 5. N'-(2-hydroxyethyl)-1-methyl-5-nitroimidazole-2-carboxamide | 87°–88°C | 305.0 / 222.0 | 529 / 485 | ethanol amine |
| 6. 1,N',N'-trimethyl-5-nitroimidazole-2-carboxamide | 125.5°–127°C | 302.5 | 425 | dimethylamine (gaseous) |

The solvents indicated are used as recrystallization solvents: Compound 1: acetone-ether; Compound 2: methylene chloride; Compounds 3 and 6: ether; Compound 6: dimethylformamide-ether; Compound 5: acetone.

EXAMPLE 9

1-Methyl-N'-p-fluorophenyl-5-Nitroimidazole-2-Carboxamide 5.0 Gm. (0.02 M) of 1-methyl-5-nitroimidazole-2-carbonyl chloride is dissolved in 100 ml. of warm benzene. This solution is then added with rapid stirring to 15 ml. of p-fluoroaniline in 100 ml. of ether. The solution becomes warm due to heat of reaction. It is filtered warm to remove the solid p-fluoroaniline hydrochloride which forms.

The benzene filtrate is evaporated to near dryness in vacuo. The residue is triturated with ether. Crystallization of 1-methyl-N'-p-fluorophenyl-5-nitroimidazole-2-carboxamide begins and is allowed to proceed to completion in the cold. The crystalline product is then recovered by filtration and washed with cold ether. The solid is recrystallized from acetone-ether to give substantially pure 1-methyl-N'-p-fluorophenyl-5-nitroimidazole-2-carboxamide.

In accordance with the above procedure, but starting with p-chloroaniline, p-toluidine, p-nitroaniline, p-anisidine, and the ortho and metal analogs thereof in place of p-fluoroaniline, there is obtained the corresponding 1-methyl-N'-p-chlorophenyl-5-nitroimidazole-2-carboxamide, 1-methyl-N'-p-tolyl-5-nitroimidazole-2-carboxamide, 1-methyl-N'-p-nitrophenyl-5-nitroimidazole-2-carboxamide, 1-methyl-N'-p-methoxyphenyl-5-nitroimidazole-2-carboxamide, and the corresponding 1-methyl-N'-(o- or m-) substituted phenyl-5-nitroimidazole-2-carboxamides.

EXAMPLE 10

1-N'-(1-Hydroxypropyl)-5-Nitroimidazole-2-Carboxamide 5.0 Gm. (0.02 M) of 1-methyl-5-nitroimidazole-2-carbonyl chloride is dissolved in 100 ml. of warm benzene. This solution is then added with rapid stirring to 15 ml. of 3-hydroxy-n-propylamine in 100 ml. of ether. The solution becomes warm due to heat of reaction. It is filtered warm to remove the solid 3-hydroxy-n-propylamine hydrochloride which forms.

The benzene filtrate is evaporated to near dryness in vacuo. The residue is triturated with either. Crystallization of 1-methyl-N'-(3-hydroxy-n-propyl)-5-nitroimidazole-2-carboxamide begins and is allowed to proceed to completion in the cold. The crystalline product is then recovered by filtration and washed with cold ether. The solid is recrystallized from acetone-ether to give substantially pure 1-methyl-N'-(3-hydroxy-n-propyl)-5-nitroimidazole-2-carboxamide.

In accordance with the above procedure but starting with ethanolamine, butanolamine or tris(hydroxymethyl) methylamine in place of 1-hydroxypropylamine, there is obtained the corresponding 1-methyl-N'-hydroxyethyl-5-nitroimidazole-2-carboxamide, 1-methyl-N'-hydroxybutyl-5-nitroimidazole-2carboxamide, 1-methyl-N'-tris(hydroxymethyl)-methyl-5-nitroimidazole-2-carboxamide.

In accordance with the above procedure but using the corresponding mercapto alkylamine in place of the hydroxyalkylamine, there is obtained the corresponding 1-methyl-N'-(mercaptoalkyl)-5-nitroimidazole-2-carboxamide.

EXAMPLE 11

1-N'-(2-Thiazolyl)-1-Methyl-5-Nitroimidazole-2-Carboxamide 5.0 Gm. (0.02 M) of 1-methyl-5-nitroimidazole-2-carbonyl chloride is dissolved in 100 ml. of warm benzene. This solution is then added with rapid stirring to 15 ml. of 2-aminothiazole in 100 ml. of ether. The solution becomes warm due to heat of reaction. It is filtered warm to remove the solid 2-aminothiazole hydrochloride which forms.

The benzene filtrate is evaporated to near dryness in vacuo. The residue is triturated with ether. Crystallization of N'-(2-thiazolyl)-1-methyl-5-nitroimidazole-2-carboxamide begins and is allowed to proceed to completion in the cold. The crystalline product is then recovered by filtration from ether to give substantially pure N'-(2-thiazolyl)-1-methyl-5-nitroimidazole-2-carboxamide, m.p. 275°–285°C., $\lambda_{max}^{CH_3OH}$ 321, 270, 220 m$\mu$, E percent 339, 145, 226.

In accordance with the above procedure, but starting with 2-aminoimidazole, 2-, 3-, or 4-amino pyridine or 2-amino pyrimidine in place of 2-aminothiazole, there is obtained the corresponding N'-(2-imidazolyl)-5-nitroimidazole-2-carboxamide, N'-(2-pyridyl)-5-nitroimidazole-2-carboxamide, N'-(3-pyridyl)-5-nitroimidazole-2-carboxamide, N'-(4-pyridyl)-5-nitroimidazole-2-carboxamide, and N'-(2-pyrimidyl)-5-nitroimidazole-2-carboxamide.

EXAMPLE 12

2.00 Gm. (0.01 M) of ethyl-1-methyl-5-nitroimidazole-2-carboxylate is dissolved in 20 ml. of warm 95 percent ethanol. This solution is added in one portion to 40 ml. of well stirred and cooled concentrated ammonium hydroxide. The resulting reaction mixture is allowed to stand in the cold until crystallization is complete.

The crystalline 1-methyl-5-nitroimidazole-2-carboxamide is recovered by filtration and washed with water. It is then recrystallized from warm 95 percent ethanol to give 1-methyl-5-nitroimidazole-2-carboxamide, m.p. 218°–221°C. (dec.) $\lambda_{max}^{CH_3OH}$ 301 m$\mu$ E percent 493.

When this procedure is repeated using (1) aqueous hydrazine and (2) aqueous methylamine instead of ammonium hydroxide, the following products are respectively obtained:
1. 1-Methyl-5-nitroimidazole-2-carbonyl hydrazine, m.p. 155°–156°C; $\lambda_{max}^{CH_3OH}$ 306 m$\mu$ E% 581, after recrystallization from ethanol-ether.
2. 1,N'-Dimethyl-5-nitroimidazole-2-carboxamide, m.p. 109°–110°C; $\lambda_{max}^{CH_3OH}$ 303.0 m$\mu$, E percent 571, after recrystallization from acetone-ether.

In accordance with the above procedure but starting with aqueous ethylamine, propylamine or butylamine in place of aqueous methylamine, there is obtained the corresponding 1-methyl-N'-ethyl-5-nitroimidazole-2-carboxamide, 1-methyl-N'-propyl-5-nitroimidazole-2-carboxamide, and 1-methyl-N'-butyl-5-nitroimidazole-2-carboxamide.

EXAMPLE 13

N'-Benzyl-1-Methyl-5-Nitroimidazole-2-Carboxamide 0.01 Mol of ethyl-1-methyl-5-nitroimidazole-2-carboxylate is dissolved in 20 ml. of warm 95 percent ethanol. This solution is added in one portion to a solution of 0.12 mol of benzylamine in 40 ml. of ethanol with stirring and cooling. The resulting reaction mixture is allowed to stand in the cold until crystallization is complete.

The crystalline N'-benzyl-1-methyl-5-nitroimidazole-2-carboxamide is recovered by filtration and washed with water. It is then recrystallized from warm methanolether to give N'-benzyl-1-methyl-5-nitroimidazole-2-carboxamide, m.p. 173°–175°C., $\lambda_{max}^{CH_3OH}$ 305.0 m$\mu$ E percent 443.

In accordance with the above procedure but using ethanolic phenethylamine or p-chlorobenzylamine in place of benzylamine, there is obtained the corresponding N'-phenethyl-1-methyl-5-nitroimidazole-2-carboxamide and N'-chlorobenzyl-1-methyl-5-nitroimidazole-2-carboxamide.

EXAMPLE 14

A. Sodium 1-Methyl-5-Nitroimidazole-2-Carboxylate 5.0 Gm. (0.025 M) of ethyl-1-methyl-5-nitroimidazole-2-carboxylate is dissolved in 80 ml. of warm ethanol. 15.0 Ml. (0.037 M) of aqueous 2.5 N NaOH is added in one portion with vigorous stirring and cooling. The reaction mixture is allowed to cool in the ice bath for about 45 minutes during which time sodium 1-methyl-5-nitroimidazole-2-carboxylate crystallizes.

The solid sodium 1-methyl-5-nitroimidazole-2-carboxylate is recovered by filtration and washed with 20 ml. of cold ethanol. After air drying the product melts at 275°C. (dec.).

The sodium 1-methyl-5-nitroimidazole-2-carboxylate is generally used without purification. If desired, it is purified by recrystallization from methanol to give material melting at 275°–280°C. (dec.); $\lambda_{max.}^{CH_3OH}$ 312 m$\mu$, E percent 458.

B. 1-Methyl-5-Nitroimidazole-2-Carbonyl Chloride 9.70 Gm. (0.051 M) of sodium 1-methyl-5-nitroimidazole-2-carboxylate is suspended in benzene. 30 ML. (0.24 M) of oxalyl chloride is added and the reaction mixture allowed to stand until the evolution of gas subsides. It is then warmed to reflux on a steam bath, then the benzene is evaporated in vacuo. The resulting crude solids are flushed with benzene to remove any traces of oxalyl chloride.

The solid 1-methyl-5-nitroimidazole-2-carbonyl chloride which remains is extracted with warm benzene. The benzene extract is filtered to remove any solid and concentrated to dryness in vacuo. The 1-methyl-5-nitroimidazole-2-carbonyl chloride crystallizes, m.p. 150°–153°C; $\lambda_{max.}^{hexane}$ 293, 224 m$\mu$.

EXAMPLE 15

Methyl 1-Methyl-5-Nitroimidazole-2-Carboxylate 10.28 G. of a mixture of crude potassium 1-methyl-5-nitroimidazole-2-carboxylate is stirred in 40 ml. of dimethyl sulfoxide at about 50°C. for about 10 minutes. To this mixture then is added 6.7 ml. of dimethyl sulfate with stirring. The reaction mixture is maintained at a temperature of 60°–65°C. for 1¼ hours. The reaction vessel is vented to a silicone oil bubbler.

At the end of the heating period, the mixture is cooled to room temperature and filtered. The salts on the filter funnel are washed with small portions of acetonitrile and the washes added to the filtrate.

The filtrate is concentrated in vacuo (120°C., 1.5 mm) to an oily-solid residue. This residue is dissolved partially in 40 ml. of water and the entire mixture extracted with 6 × 40 ml. of ether. The ether extracts are combined, dried with MgSO$_4$, and filtered to remove any solid materials present.

The ether solution is gassed for 15 minutes with trimethylamine to react with any residual dimethylsulfate. The ether is then removed under vacuum at room temperature. 3.76 G. of solid crude methyl-1-methyl-5-nitroimidazole-2-carboxylate are obtained. The product is purified by slurrying in 20 ml. of ether at room temperature for about 20 minutes. The slurry is filtered, and the solid methyl 1-methyl-5-nitroimidazole-2-carboxylate dried in vacuo at 50°C., m.p. 107°–110°C.

1-Methyl-5-nitroimidazole-2-carboxamide is obtained by dissolving 2 gm. of the above ester in 60 ml. of ethanol, warming the solution to 45°C., and treating the warm solution with gaseous ammonia for about 20 minutes. The amide crystallizes and is recovered by filtration, m.p. 218°–219°C.

EXAMPLE 16

1-(2-p-Toluenesulfonyloxy)-2-Ethyl-2-Styryl-5-Nitroimidazole

Five hundred and twenty Mg. of 1-(2-hydroxyethyl)-2-styryl-5-nitroimidazole and 381 mg. of p-toluenesulfonyl chloride are combined in 4 ml. of dry pyridine and the resulting mixture is allowed to stand at room temperature for 3 hours. The mixture is then poured into an ice-water mixture and the precipitated 1-(2-p-toluenesulfonyloxy)-ethyl-2-styryl-5-nitroimidazole collected by filtration and air-dried. It is purified by recrystallization from ethyl acetate and then from acetone to give pure 1-(2-p-toluenesulfonyloxy)-ethyl-2-styryl-5-nitroimidazole, m.p. 179°–181°C. The unrecrystallized material is suitable for further use in the process.

The 1-(2-hydroxyethyl)-2-styryl-5-nitroimidazole employed as starting material for this example is prepared as follows:

1.0 Gm. of 1-(2-hydroxyethyl)-2-methyl-5-nitroimidazole, 1 ml. of benzaldehyde and 500 mg. of sodium methoxide are dissolved in 20 ml. of ethanol and the mixture warmed to 70°C. for 25 minutes. The mixture is then cooled to room temperature and an equal volume of water is added. The resulting precipitated 1-(2-hydroxyethyl)-2-styryl-5-nitroimidazole is collected by filtration and air-dried. It is recrystallized from ether and then from ethyl acetate to give substantially pure material, m.p. 156°–8°C.; $\lambda_{max.}^{CH_3OH}$ 300 m$\mu$, E% 509; 365 m$\mu$, E percent 907.

EXAMPLE 17

1-(2-Hydroxyethyl)-5-Nitroimidazole-2-Carboxylic Acid-$\gamma$-Lactone

To 3.54 gm. of 1-(2-p-toluenesulfonyloxy)-ethyl-2-styryl-5-nitroimidazole in 150 ml. of acetone, there is added 3.56 gm. of potassium permanganate in small portions and with ice-bath cooling over a period of 45 minutes. The mixture is then stirred for 45 minutes at 0°C. and then filtered to remove the manganese dioxide. The acetone filtrate is concentrated to a semi-solid residue which is purified by sublimation to give 1-(2-hydroxyethyl)-5-nitroimidazole-2-carboxylic acid-$\gamma$-lactone, m.p. 185°–199°C. Recrystallization from ethyl acetate yields substantially pure material, m.p. 200°–201.5°C.; $\lambda_{max.}^{CH_3OH}$ 222.5 m$\mu$, E percent 255; 297 m$\mu$, E percent 153; 365 m$\mu$, E% 290.

EXAMPLE 18

1-(2-Hydroxyethyl)-5-Nitroimidazole-2-Carboxamide

One hundred and forty-four Mg. of 1-(2-hydroxyethyl)-5-nitroimidazole-2-carboxylic acid-$\gamma$-lactone is dissolved in 20 ml. of methanol, and the resulting solution is held at 50°C. for 15 minutes while dry ammonia is bubbled into the solution. The solution is then concentrated to dryness in vacuo, and the residue is recrystallized from ethyl acetate to give 1-(2-hydroxyethyl)-5-nitroimidazole-2-carboxamide, m.p. 160°–162°C. On recrystallization from acetone, the product melts at 163.5°–164.5°C.

EXAMPLE 19

A. 1-(2-Acetoxyethyl)-5-Nitroimidazole-2-Carboxamide 2.00 G. (10 mmol) of 1-(2-hydroxyethyl)-5-nitroimidazole-2-carboxamide is dissolved in a mixture of 10 ml. of pyridine and 1.12 g. (11 mmol) of acetic anhydride. The mixture is allowed to stand for 4 hours at room temperature, and then is poured into 110 ml. of 1.25 N HCl. The resulting aqueous solution is extracted with 3 × 50 ml. of ethyl acetate. The extracts are combined and dried over sodium sulfate. They are then evaporated in vacuo to dryness to give substantially pure 1-(2-acetoxyethyl)-5-nitroimidazole-2-carboxamide.

Substitution of an equivalent amount of benzoyl chloride or propionic anhydride for the acetic anhydride in the above process affords the corresponding benzoyl and propionyl esters of 1-(2-hydroxyethyl)-5-nitroimidazole-2-carboxamide.

B. 2.00 G. (10 mmol) of 1-(2-hydroxyethyl)-5-nitroimidazole-2-carboxamide and 1.00 g. (10 mmol) of succinic anhydride are refluxed together for 30 minutes in 10 ml. of pyridine. The reaction mixture is then cooled and poured into 100 ml. of 1.25 N HCl. The solution is extracted with 3 × 50 ml. of ethyl acetate. The combined ethyl acetate extracts are dried over $Na_2SO_4$ and evaporated to dryness in vacuo to leave the succinic acid monoester of 1-(2-hydroxyethyl)-5-nitroimidazole-2-carboxamide as a semi-pure residue. Recrystallization from methanol yields the pure material.

EXAMPLE 20

N-[1-(2-Hydroxyethyl)-5-Nitroimidazole-2-Carbonyl]-Pyrrolidine

Two hundred Mg. (1.09 mmol) of 1-(2-hydroxyethyl)-5-nitroimidazole-2-carboxylic acid-γ-lactone is added to 0.5 ml. of pyrrolidine. The mixture becomes warm and the lactone dissolves. The mixture is warmed in a steam bath for about 10 seconds, then cooled and diluted with 5 ml. of water. The aqueous solution is made slightly acidic with 2.5 N HCl and extracted with three 5 ml. portions of ethyl acetate. These extracts are combined, dried over sodium sulfate and then concentrated in vacuo to an almost colorless syrup. This syrup is crystallized by cooling and scratching in the presence of a drop of ethyl acetate. This crystalline N-[1-(2-hydroxyethyl)-5-nitroimidazole-2-carbonyl]-pyrrolidine is recrystallized from ethyl acetate and then from ether to give pure material, m.p. 83°–85°C., $\lambda_{max.}^{CH_3OH}$ 304 mμ, E percent 409; 217 mμ, E% 474.

EXAMPLE 21

N-α-(1-Methyl-5-Nitroimidazole-2-Carbonyl)-Glycine Amide;
N-(1-Methyl-5-Nitroimidazole-2-Carbonyl)-glucosamine A. Five hundred Mg. (0.002 M) sample of 1-methyl-5-nitroimidazole-2-carbonyl chloride, mixed with one equivalent of sodium chloride, is dissolved in 20 ml. of warm benzene. This solution is added with rapid stirring to a cold solution of 10 gm. of glycine amide hydrochloride in 100 ml. of aqueous 50 percent saturated sodium carbonate.

The solution is then evaporated to a small volume in vacuo. It is cooled and triturated with acetone to induce crystallization of N-α-(1-methyl-5-nitroimidazole-2-carbonyl)-glycine amide. The crystalline product is filtered off and washed with cold 50 percent aqueous acetone. The material is then recrystallized from dimethylformamide-ether to give pure N-α-(1-methyl-5-nitroimidazole-2-carbonyl)-glycine amide, m.p. 242°–243°C.

In accordance with the above procedure but starting with valine amide hydrochloride, alanine amide hydrochloride, leucine amide hydrochloride and isoleucine amide hydrochloride in place of glycine amide, there is obtained the corresponding N-α-(1-methyl-5-nitroimidazole-2-carbonyl)-valine amide, N-α-(1-methyl-5-nitroimidazole-2-carbonyl)-alanine amide, N-α-(1-methyl-5-nitroimidazole-2-carbonyl)-leucine amide and N-α-(1-methyl-5-nitroimidazole-2-carbonyl)-isoleucine amide.

B. N-1-(methyl-5-nitroimidazole-2-carbonyl)-glucosamine is obtained by reacting glucosamine with 1-methyl-5-nitroimidazole-2-carbonyl chloride as described in Part A above. On completion of the reaction, the desired product is extracted into chloroform, and the chloroform extracts concentrated to dryness in vacuo. The residue thus obtained is recrystallized from isopropanol to give crystalline N-(1-methyl-5-nitroimidazole-2-carbonyl)-glucosamine as the isopropanol solvate, m.p. 201°–204°C.

EXAMPLE 22

A. N'-(2,3-Dihydroxypropyl)-1-Methyl-5-Nitroimidazole-2-Carboxamide 0.3 G. of methyl-1-methyl-5-nitroimidazole-2-carboxylate and 0.5 g. of aminoglycerol are mixed and heated on a steam bath for 20 minutes. The reaction mixture is then cooled and 6 ml. of water are added to it. The solution is extracted six times with 6 ml. portions of ethyl acetate. The ethyl acetate extracts are combined, dried over sodium sulfate and then concentrated to dryness in vacuo to give N'-(2,3-dihydroxypropyl)-1-methyl-5-nitroimidazole-2-carboxamide as a tan solid. The material is recrystallized from ethyl acetate to give purified amide, m.p. 119°–126°C.

B. 1-N'-Di-(2-Hydroxyethyl)-5-Nitroimidazole-2-Carboxamide 0.5 G. of 1-(2-hydroxyethyl)-5-nitroimidazole-2-carboxylic acid-γ-lactone is added to 0.75 ml. of aminoethanol. The resulting mixture is stirred thoroughly and then allowed to stand at room temperature for about 20 minutes. 12 Ml. of water are then added and the resulting mixture is stirred until complete solution is obtained. The resulting solution is extracted with 4 × 10 ml. portions of ethyl acetate. The ethyl acetate extracts are combined, dried over sodium sulfate and evaporated to dryness in vacuo to give a crystalline product. This material is recrystallized twice from ethyl acetate to give crystals of 1-N'-di-(2-hydroxyethyl)-5-nitroimidazole-2-carboxamide, m.p. 100°–108°C.

EXAMPLE 23

Ethyl 1-Methyl-5-Nitroimidazole-2-Carboxylate 1.0 G. of unpurified 1-methyl-5-nitroimidazole-2-carbonyl chloride, prepared as in Example 4, is dissolved in a mixture of 1 ml. of pyridine and 4 ml. of anhydrous ethanol and the resulting mixture allowed to stand at room temperature for one-half hour. The reaction mixture is then diluted with 25 ml. of 0.5N HCl and extracted with 3 × 25 ml. of ether. The combined ether extracts are dried over sodium sulfate and then evaporated to dryness. The residue is recrystallized from ether-hexane to yield pure ethyl 1-methyl-5-nitroimidazole-2-carboxylate.

The methyl, propyl, butyl, benzyl and allyl esters of 1-methyl-5-nitroimidazole-2-carboxylic acid are obtained in like fashion from the carbonyl chloride by using the appropriate alcohol in place of ethanol.

EXAMPLE 24

2-Hydroxymethyl-4-(or 5)-Nitroimidazole 1.36 G. of 2-hydroxymethylimidazole (0.0139 m) is dissolved in a solution of 1 ml. of concentrated nitric acid in 10 ml. of acetic anhydride. The mixture is warmed on a steam bath for 5 minutes, then poured over ice. After decomposition of the acetic anhydride is complete, the mixture is neutralized with 5 percent sodium bicarbonate solution and then extracted with an equal volume of ethyl acetate. The ethyl acetate extracts are washed with water and concentrated to a residue which is hydrolyzed by dissolving in a mixture of 20 ml. of methanol and 10 ml. of 3N aqueous sodium hydroxide and heating the resulting solution for 30 minutes under reflux. The hydrolysis mixture is cooled, neutralized with dilute hydrochloric acid, and extracted with an equal volume of ethyl acetate. The solvent extracts are washed with water and concentrated to dryness in vacuo. The residue thus obtained is dissolved in 10 ml. of acetone and the solution added to a column made up of 18 grams of activated charcoal and 21 grams of celite. The column is eluted with 1:1 acetone-ether, and the eluates concentrated to dryness to give substantially pure 2-hydroxymethyl-4-(or 5)-nitroimidazole, m.p. 154°–7°C.

EXAMPLE 25

1-Ethyl-2-Hydroxymethyl-5-Nitroimidazole 1.43 G. (10 mmol) of 2-hydroxymethyl-4(5)-nitroimidazole and 1.54 g. of ethyl sulfate (10 mmol) are heated together at 130°C. for about 5 minutes. The mixture is then cooled and dissolved in a mixture of chloroform and an excess of dilute aqueous sodium hydroxide. The chloroform phase is separated and dried over $Na_2SO_4$. It is then evaporated to dryness in vacuo to leave a viscous oil. This oil is dissolved in 3:1 ether: $CH_2Cl_2$ and filtered through 15 g. of Merck alkaline alumina. The eluate is evaporated in vacuo to give a nearly colorless oily product. Crystals of 1-ethyl-2-hydroxymethyl-5-nitroimidazole form on chilling this oil in an ice bath.

Any departure from the above description which conforms to the present invention is intended to be included within the scope of the claims.

What is claimed is:

1. A 5-nitroimidazole compound having the formula:

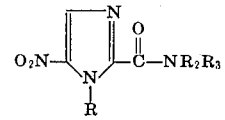

where R is loweralkyl or $-(CH_2)_nOX$, n having a value of 2, 3, or 4, and X is hydrogen, loweralkanoyl, or benzoyl; $R_2$ is hydrogen or loweralkyl; and $R_3$ is hydrogen, loweralkyl, hydroxyloweralkyl, mercaptoloweralkyl, phenyl, tolyl, halophenyl, nitrophenyl, loweralkoxyphenyl, or amino, or $NR_2R_3$ together represent morpholino, piperidinyl, piperazinyl, or pyrrolidinyl.

2. A compound according to claim 1 designated as 1-loweralkyl-5-nitroimidazole-2-carboxamide.

3. A compound according to claim 1 designated as 1-methyl-5-nitroimidazole-2-carboxamide.

4. A compound according to claim 1 designated as 1,N',N'-trimethyl-5-nitroimidazole-2-carboxamide.

5. A compound according to claim 1 designated as 1,N'-dimethyl-5-nitroimidazole-2-carboxamide.

6. A compound according to claim 1 designated as 1-(2-hydroxyethyl)-5-nitroimidazole-2-carboxamide.

7. A compound according to claim 1 designated as 1-methyl-N'-[(trishydroxymethyl)methyl]-5-nitroimidazole-2-carboxamide.

* * * * *